United States Patent Office 3,239,794
Patented Mar. 8, 1966

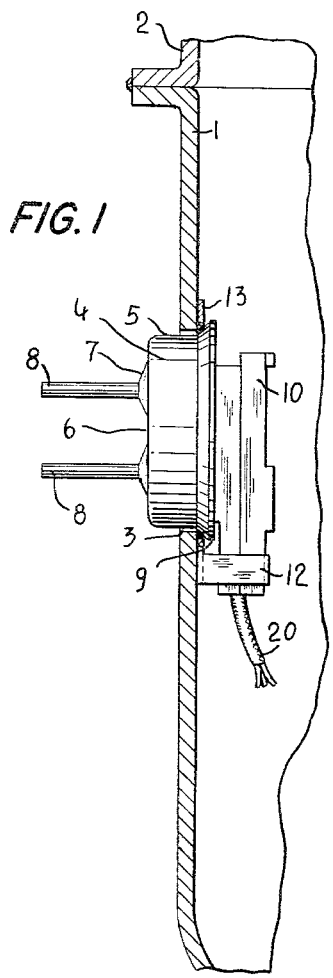
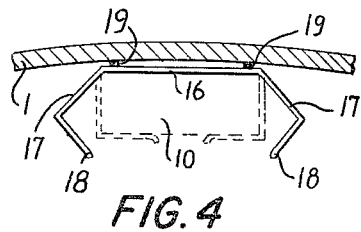
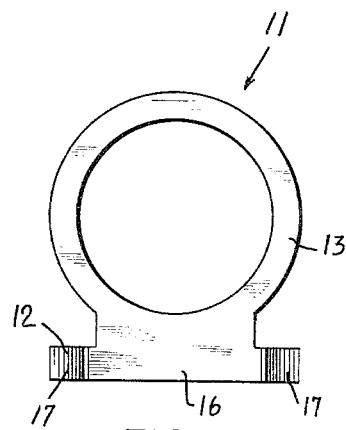
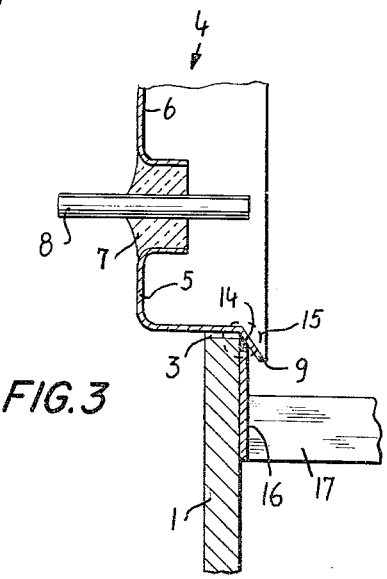
FIG. 1
FIG. 4
FIG. 2
FIG. 3

3,239,794
MOUNTING ASSEMBLY FOR LEAD-IN UNIT AND RECEPTACLE FOR HERMETICALLY ENCLOSED MOTOR COMPRESSOR
Knud Roelsgaard, Nordborg, and Alfred Hildebrandt, Havnbjerg, Denmark, assignors to Danfoss ved Ing. M. Clausen, Nordborg, Denmark, a company of Denmark
Filed Nov. 20, 1961, Ser. No. 153,563
4 Claims. (Cl. 339—75)

This invention relates to a hermetically-enclosed motor compressor and is more particularly concerned with a motor compressor of the character indicated which is especially suitable for use with small refrigerating machines.

In general, most motor compressors constructed for use with small refrigerating machines are fitted with a lead-in unit which is built in a pressure-proof manner into the wall of the hermetically-enclosing capsule. The lead-in unit is provided with connecting pins extending through it and which can be plugged into receptacles at either end, and the connecting pins are insulated from the body of the lead-in unit by means of glass or other insulating material. The lead-in unit is normally in the form of a cylindrical container of a very short overall length, and the body proper is seated in an aperture in the wall of the capsule, and bears against the latter with a conically-flanged edge. This edge is suitably welded to the wall of the capsule to effect a pressure-proof joint between the lead-in unit and the capsule.

Prior to the final sealing of the capsule, the receptacle carrying the connecting leads to the motor is connected to that end of the lead-in unit which is directed inwardly. In modern motor compressors, where the demand for noise suppression is high, the motor associated with the compressor unit is usually elastically suspended inside the capsule in order to reduce noise. In spite of an elastic suspension for the motor and in spite of the use of soft connecting leads, vibrations from the motor are nevertheless, in certain cases, transmitted to the connecting pins and these vibrations may, after a period of time, result in partial or total interruption of the contact at that point. In the case of hermetically-enclosed motor compressors in particular, a failure of this nature is very serious, since repair can be effected only by opening the capsule, which usually has to be done by the manufacturer. Despite the relatively minor actual repair operation which is necessary, the total cost of repair will substantially increase the manufacturing cost of the motor compressor, and apart from these costs, which the manufacturer will have to defray under the usual 5-year guarantee which is now offered with respect to the capsule, consideration must also be given to the loss of reputation which may result from faulty operation of the capsule and the necessity for repair.

It is accordingly an object of this invention to provide an improved connecting construction which is highly resistant to failure and separation and which avoids the foregoing drawbacks and disadvantages.

According to the invention, the above and other objects are achieved by a construction which embodies a mechanical locking of the receptacle by means of a retaining device connected to the wall of the capsule. Such mechanical locking does not merely prevent the receptacle from being pulled out of the connecting pins, but also eliminates vibrations between the receptacle and the connecting pins which may lead to fatigue failure of the spring contacts in the receptacle, with consequent contact problems or partial or total disengagement such as mentioned above.

Thus, in accordance with one embodiment, the desired mechanical locking is effected by the use of a locking clamp firmly secured to the wall of the capsule. After the receptacle has been plugged in, the locking clamp, or part of the clamp, is placed around, e.g. by bending, the rear portion of the receptacle. As it appears, this method will ensure a positive locking. The locking clamp is suitably fitted with a flange ring having an inner diameter which fits the outer diameter of the lead-in unit, and secured to the wall of the capsule by the action of the conical inner end portion of the lead-in unit. Such a locking clamp can be installed in practice with negligible increase in manufacturing cost. The flange ring is welded to the capsule simultaneously with the lead-in unit. Because of the increase of the cross-sectional area of the weld seam thus brought about, the flange ring will actually improve the pressure-proof joint between the lead-in unit and the wall of the capsule.

Other objects and features of the invention will be readily apparent from the following detailed description of illustrative embodiment of the invention taken in connection with the accompanying drawing, wherein, FIG. 1 is a longitudinal section of the wall of a capsule showing in end elevation a receptacle and a retaining device embodying features of the present invention;

FIG. 2 is a top plan view of the retaining device shown in FIG. 1;

FIG. 3 is a sectional view on an enlarged scale of the weld seam area; and

FIG. 4 is a sectional view showing another embodiment of the locking clamp of the invention.

Referring to the drawing, and more particularly to FIGS. 1 to 3, there is partially shown the lower portion 1 of a capsule proper which is hermetically sealed by welding to a cover 2 and which houses the compressor unit and the motor (not shown). The wall of portion 1 is formed with a circular opening 3 in which is seated a lead-in unit 4. The cylindrical part 5 of the lead-in unit 4 is received in the opening 3. The insulating material 7 and the connecting pins 8 are received in the bottom 6 of the cylindrical part 5. The lead-in unit is suitably welded directly to the wall of the capsule surrounding the opening 3 by means of the conically-shaped end portion 9. The contacts of the receptacle 10 engage the inwardly directed end portions of the connecting pins 8.

In accordance with the invention, there is provided a retaining device 11, which consists of a locking clamp 12 and a flange ring 13. The inner diameter of the flange ring is slightly greater than the diameter of the opening 3 in the wall of the capsule, which in turn is slightly greater than the outer diameter of the cylindrical part 5 of the lead-in unit. Consequently, when the flange ring 13 is placed between the wall of the capsule and the conical end portion 9 of the lead-in unit, the construction shown in FIG. 3 is provided, in which the portion 9, after the lead-in unit has been welded in place, secures the flange ring 13 against the edge 14 on the wall of the capsule. There is no difficulty in applying the welding tools to effect this mounting and the material of the flange ring 13 is such, e.g. iron, that the flange ring, during welding, is drawn inwards and, as indicated by the shaded area 15, forms a relatively strong weld seam, which will increase the strength of the joint extended over a larger area between the flange ring 13 and the wall of the capsule 1. As is illustrated in FIG. 4, the locking clamp 12 consists of a center piece 16 and two arms 17, which are suitably pre-bent. After insertion of the receptatcle 10 between the arms, the arms are readily pressed towards one another, e.g. by means of pliers into the position shown in broken lines thus securing the receptacle. To facilitate insertion of the receptacle, the tips of the arms 17 are suitably bent slightly outwardly, as shown at 18.

When the arms 17 are bent at a right angle as seen in FIG. 4, locking can be effected by gripping the inner parts of the arms 17. This method is particularly advantageous because in modern machines the capsule is not much greater in size than the motor-compressor unit, since it is desirable to maintain as high as possible the ratio of useful volume to the overall volume of the refrigerator. Therefore, in most cases, only a relatively small space is left for the application of tools to apply a pressure at right angles to the wall of the capsule.

In the embodiment illustrated in FIG. 4, the locking clamp is not secured to the wall of the capsule by means of a flange ring 13, but is, in this case, provided with a spacer 19, by means of which it is welded to the wall of the capsule 1, independently of the lead-in unit.

In the embodiments illustrated in the drawing, the locking clamp 12 grips that area of the front end of the receptacle from which the connecting cable 20 extends. This locking thus effects a positive safeguarding, because the locking assembly grips the receptacle at a point which lies outside the lead-in unit axis, and over an area at which forces imparted through the connecting cable 20 will act.

It will be understood that various changes and modifications may be made in the embodiments described and illustrated without departing from the scope of the invention as defined in the appended claims. Thus, for example, retaining devices in the form of U-shaped clamps made of bent spring wire may be used, the pointed ends of which are inserted into corresponding recesses or lugs on the flange ring 13. It will also be clear that the retaining device need not be firmly secured to the wall of the capsule. Since, the lead-in unit will form part of the wall of the capsule after being installed, it will be seen that the lead-in unit can be used for securing the retaining device in position.

It is intended, therefore, that all matter contained in the foregoing description and shown in the drawing shall be interpreted as illustrative only and not as limitative of the invention. In the drawing the motor and the compressor contained in the capsule have not been shown, nor has the remainder of the capsule since these parts are of conventional construction, as shown, for example, in U.S. 2,312,596 and form no part of the present invention.

We claim:

1. In a hermetically-enclosed motor compressor assembly having a capsule having a wall provided with an opening in which is disposed a pressure-proof built-in lead-in unit with connecting pins, and a receptacle mounted upon said connecting pins, a retaining element mechanically securing said receptacle upon said pins, said retaining element being connected to the wall of the capsule, said retaining element consisting of a locking clamp secured to the wall of the capsule, said locking clamp consisting of a central portion and two arms bent at right angles thereto, said locking clamp being adapted to be locked about the receptacle solely by pressing together the inner parts of the arms, and said central portion being in the form of a flange ring having an inner diameter which corresponds to the outer diameter of the lead-in unit, and said lead-in unit has a conical end portion, said flange ring being secured to the wall of the capsule by means of said conical portion of the lead-in unit.

2. In a hermetically-enclosed motor compressor assembly having a capsule having a wall provided with an opening in which is disposed a pressure-proof built-in lead-in unit with connecting pins, and a receptacle mounted upon said connecting pins, a retaining element mechanically securing said receptacle upon said pins, said retaining element being connected to the wall of the capsule, said retaining element consisting of a locking clamp secured to the wall of the capsule, said locking clamp consisting of a central portion and two arms bent at right angles thereto, said locking clamp being adapted to be locked about the receptacle solely by pressing together the inner parts of the arms, and said central portion being in the form of a flange ring having an inner diameter which corresponds to the outer diameter of the lead-in unit, and said lead-in unit has a conical end portion, said flange ring being secured to the wall of the capsule by means of said conical portion of the lead-in unit, said lead-in unit, the wall of the capsule, and the flange ring of the locking clamp all being connected by the same weld, said weld extending entirely around said opening in the capsule wall.

3. In a hermetically-enclosed motor compressor assembly having a capsule having a wall provided with an opening in which is disposed a pressure-proof built-in lead-in unit with connecting pins, and a receptacle mounted upon said connecting pins, a retaining element mechanically securing said receptacle upon said pins, said retaining element being connected to the wall of the capsule, said retaining element consisting of a locking clamp secured to the wall of the capsule, said locking clamp consisting of a central portion and two arms bent at right angles thereto, said locking clamp being adapted to be locked about the receptacle solely by pressing together the inner parts of the arms, and said central portion being in the form of a flange ring having an inner diameter which corresponds to the outer diameter of the lead-in unit, and said lead-in unit has a conical end portion, said flange ring being secured to the wall of the capsule by means of said conical portion of the lead-in unit, said receptacle having a connecting cable leading from it at one side thereof and said retaining element securing the receptacle adjacent said one side in that area in which the connecting cable leads from the receptacle.

4. In a hermetically-enclosed motor compressor assembly having a capsule having a wall provided with an opening in which is disposed a pressure-proof built-in lead-in unit with connecting pins, and a receptacle mounted upon said connecting pins, a retaining element mechanically securing said receptacle upon said pins, said retaining element being connected to the wall of the capsule, said retaining element consisting of a locking clamp secured to the wall of the capsule, said locking clamp consisting of a central portion and two arms bent at right angles thereto, said locking clamp being adapted to be locked about the receptacle solely by pressing together the inner parts of the arms, and said central portion being in the form of a flange ring having an inner diameter which corresponds to the outer diameter of the lead-in unit, and said lead-in unit has a conical end portion, said flange ring being secured to the wall of the capsule by means of said conical portion of the lead-in unit, said lead-in unit, the wall of the capsule, and the flange ring of the locking clamp all being connected by the same weld, said weld extending entirely around said opening in the capsule wall, said receptacle having a connecting cable leading from it at one side thereof and said retaining element securing the receptacle adjacent said one side in that area in which the connecting cable leads from the receptacle.

References Cited by the Examiner

UNITED STATES PATENTS

| | | | |
|---|---|---|---|
| 1,665,095 | 4/1928 | Henry | 339—75 |
| 2,265,341 | 12/1941 | Borchert | 339—126 X |
| 2,728,060 | 12/1955 | Doeg | 339—191 |
| 2,813,265 | 11/1957 | Finks | 339—147 X |
| 3,016,511 | 1/1962 | Unger | 339—191 X |
| 3,041,571 | 6/1962 | Friend et al. | 339—75 |

PATRICK A. CLIFFORD, *Primary Examiner.*

THOMAS J. HICKEY, *Examiner.*

W. D. MILLER, *Assistant Examiner.*